US006763009B1

(12) United States Patent
Bedekar et al.

(10) Patent No.: US 6,763,009 B1
(45) Date of Patent: Jul. 13, 2004

(54) DOWN-LINK TRANSMISSION SCHEDULING IN CDMA DATA NETWORKS

(75) Inventors: Anand S. Bedekar, Seattle, WA (US); Simon C. Borst, Amsterdam (NL); Kavita Ramanan, New Providence, NJ (US); Philip A. Whiting, New Providence, NJ (US); Edmund M. Yeh, Houston, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/454,039

(22) Filed: Dec. 3, 1999

(51) Int. Cl.$^7$ .......................... H04Q 7/20; H04B 7/216
(52) U.S. Cl. ...................... 370/335; 370/318; 370/326; 455/450; 455/522
(58) Field of Search ................................ 370/335, 328, 370/342, 350, 318, 320, 321, 322, 326; 455/450, 453, 509, 511, 515, 516, 522

(56) References Cited

U.S. PATENT DOCUMENTS

| | | | | |
|---|---|---|---|---|
| 5,752,194 A | * | 5/1998 | Lin et al. ..................... | 455/452 |
| 6,069,883 A | * | 5/2000 | Ejzak et al. ................. | 370/335 |
| 6,072,784 A | * | 6/2000 | Agrawal et al. ............ | 370/311 |
| 6,094,426 A | * | 7/2000 | Honkasalo et al. ......... | 370/331 |
| 6,125,260 A | * | 9/2000 | Wiedeman et al. ........ | 455/11.1 |
| 6,236,646 B1 | * | 5/2001 | Beming et al. ............. | 370/335 |
| 6,278,701 B1 | * | 8/2001 | Ayyagari et al. ........... | 370/335 |
| 6,317,435 B1 | * | 11/2001 | Tiedemann et al. ......... | 370/441 |
| 6,335,922 B1 | * | 1/2002 | Tiedemann, Jr. et al. ... | 370/335 |
| 6,603,753 B1 | * | 8/2003 | Bedekar et al. ............. | 370/335 |

OTHER PUBLICATIONS

"A Scheme for Throughput Maximization in a Dual–Class CDMA System" by Sudhir Ramakrishna and Jack M. Holtzman, *Fellow, IEEE Journal On Selected Areas In Communication*, vol. 16, No. 6, 1998, pps. 830–844.

* cited by examiner

*Primary Examiner*—Erika Gary

(57) ABSTRACT

A base station of a code division, multiple access (CDMA) telecommunications system employs scheduling of data transmission signals to corresponding user transceivers in down-link channels of a data network. One or more user transceivers may be in communication with a base station within a cell, and each user may have a minimum data rate requirement. In accordance with the present invention, the scheduling of user data transmission follows the constraints that 1) each base station transmits to user transceivers one at a time, and 2) the base station uses full available power for the down-link channel when transmitting (for data networks only). Given a data network of users, the method of scheduling and data rates may be modeled in accordance with a linear programming problem optimized according to a predefined criterion. In addition, the present method may be employed in a hybrid CDMA/time-share system to reduce power of data channels in communication with user transceivers near the base station. A continuum of rates may be achieved based on the system signal to interference ratio (S/I). The error rate requirement of a user's down-link channel may be met provided the S/I of the channel is greater than a predetermined threshold value.

27 Claims, 3 Drawing Sheets

L-TIME

R-TIME

0-TIME

2-TIME

DOWN-LINK TRANSMISSION SCHEDULING IN CDMA DATA NETWORKS

CROSS-REFERENCE TO RELATED APPLICATIONS

This application is related to U.S. patent application Ser. No. 09/454,040, filed Dec. 3, 1999, the teachings of which are incorporated herein by reference.

BACKGROUND OF THE INVENTION

1. Field of the Invention

The present invention relates to code division, multiple access (CDMA) telecommunication systems, and, more particularly, to scheduling downlink data transmission from a base station to users.

2. Description of the Related Art

Mobile cellular or wireless systems of the prior art generally have limited capabilities for transmission of data signals (data transmission) between a base station and remote users in comparison with transmission of voice or voiceband data signals. For some code division, multiple-access (CDMA) communication systems, such as those systems presently operating in accordance with the IS-95 standard, transmission of data traffic to and from users may only have a data rate of approximately 10 kbits/s. This data rate may typically be too low to satisfy delay requirements of many data applications, including connections between a remote user and the Internet or for file transfer to/from the remote user. When a large number of voice users are supported, user connections of the cellular or wireless network may be relatively easy to manage using statistical averaging. However, statistical averaging techniques may no longer be valid when a few users having high data rate traffic are admitted into the network.

Modifying resource management of existing CDMA telecommunication systems may allow a network to admit users having high data rate traffic. Resource management primarily includes schedule time, transmit power, and data rate. One approach to resource management in such CDMA networks schedules the transmission of data traffic from users to the base station (i.e., transmissions in the up-link channel) in a manner to avoid interference between user signals. Increasing the transmission rate while avoiding interference from other users compensates for a reduction in available transmission time.

FIG. 1 shows CDMA telecommunication system cell 100 comprising a base station 101 and voice and data users. Cell 100 operates in accordance with prior art methods of resource management. Base station 101 is in communication with transceivers of voice users $x_{V1}$ and $x_{V2}$ and data users $x_{D1}$ through $x_{D3}$. Base station 101 has maximum transmission power $P_{max}$ available for transmission from the base station 101 to users in a down-link channel. To maintain a rate and minimum bit error rate (BER), the base station 101 communicates with data users $x_{D1}$ through $x_{D3}$ during a time period with a certain data rate and transmit power level.

For the up-link channel, methods of the prior art may use common CDMA techniques, such as overlapping techniques (simultaneous transmission of spread signals within the same frequency band during the same time) that allow users to transmit signals to the base station 101. For both up-link and down-link channels, a BS 101 of the prior art may employ overlapping techniques for transmission of data as shown in FIG. 2. During time span $\Delta t$, the base station 101 apportions fractions $\phi_{D1}$ through $\phi_{D3}$ of the total transmit power $P_D$ to user transceivers $x_{D1}$ through $x_{D3}$. Consequently, each user receives interference noise from other users with transmissions occupying the same frequency band during the time span $\Delta t$. While providing continuous transmission of data, the overall throughput of a cell may be reduced because of the lower signal to interference noise level.

Also, methods may schedule each voice and data signal transmission between users and a base station to reduce interference noise, and these methods may employ non-overlapping scheduling techniques (i.e., spread user signals within a frequency band are transmitted either one-at-a-time, or in small, simultaneous groups). This method is used by a base station to coordinate many signals transmitted between the base station and users, which signals may experience varying forms of delay during transmission. Methods of scheduling signal transmission generally apply one or more criteria to determine which particular user signal should be transmitted. However, voice/voiceband data signals are delay non-tolerant, as opposed to data signals which are generally delay-tolerant, and as such voice signals may be adversely affected by delay caused by scheduling methods. Consequently, scheduling methods may divide user signal transmission into one or more classes depending on whether the spread signals are delay tolerant or delay intolerant.

A method of intra-cell scheduling of the prior art is described in J. M. Holtzman and S. Ramakrishna, *A Scheme for Throughput Maximization in a Dual-Class CDMA System*, I.E.E.E. Journal on Selected Areas of Communications, 40(2): 830–841, 1998. For this method, the base station schedules user transmissions in the up-link since the overlapping, asynchronous transmissions contribute significant noise to one another since the spreading codes are not aligned. Such scheduling may be employed to improve gain (SNR) in the up-link by reducing high interference noise power from non-zero partial cross-correlation of the transmitted signals. Another prior art intra-cell scheduling method may allocate transmission slots in the down-link for signal transmission from the base station to users using signal-to-noise (SNR), measurements and/or fading predictions. A user measures the SNR value of the signal received at the user transceiver and transmits the SNR value back to the base station. The base station then allocates the transmission slot based on maximizing the SNR while providing the minimum transmission delay for all users. Such scheduling methods base such allocation on various throughput criteria of the cell, and these systems may be characterized by low user speed and are generally designed for data-only (delay-tolerant user) transmission.

SUMMARY OF THE INVENTION

The present invention relates to intra-cell scheduling of transmission by a base station of one or more spread data signals to corresponding users in a cell. Each of the one or more users are allocated a recurrent time interval during which transmission of each spread data signal from the base station to the corresponding user is enabled. Before allocating the recurrent time intervals, a linear programming problem is solved that characterizes the cell, thereby to determine the recurrent time interval for each of said users. After allocating the recurrent time intervals, each of said one or more spread data signals are transmitted from the base station to the corresponding user during an allocated time interval that does not overlap the time interval allocated to any other of said one or more users, such that a transmission is made only one at a time of said one or more users.

For some embodiments of the present invention, the base station transmits each spread data signal with a transmit power that is near a relative maximum transmit power of the base station. Some embodiments of the present invention may determine the time intervals and transmit powers allocated to spread data signals based on either minimum average rates, an optimization criterion such as relative maximum throughput, or signal-to-interference noise measurements by users. According to other embodiments of the present invention, users having delay-intolerant spread signals may be allocated corresponding time intervals that may overlap time intervals of transmitted spread data signals. Other embodiments of the present invention may allocate a common time interval to a set of users during which the spread signals are transmitted in time intervals that may overlap one-another, and the spread data signals of another set of users are transmitted in corresponding time intervals that are disjoint.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with the present invention, a code division, multiple access (CDMA) telecommunications system employs scheduling of data transmission to user transceivers in down-link channels of a data network. Scheduling data transmission in the down-link to users may follow the constraints that 1) each base station transmits to data (or delay tolerant) user transceivers one at a time (for voice and data networks), and 2) the base station uses full available power when transmitting (for data networks only). A linear programming problem may be formed given i) a set of users of a data network; ii) transmission of spread data signals to users in a cell one-at-a-time and with full power; iii) the network configuration for interference to one cell by other cells; and iv) the user data rates. The linear programming problem may be solved to find scheduling that is optimized in the sense that it maximizes or minimizes objective functions sensitive to predefined criteria such as maximum throughput. In addition, the present method may be employed in a hybrid CDMA/time-share system to reduce power of data channels in communication with user transceivers that are near the base station. Such hybrid CDMA/time-share systems may employ scheduling for transmission of spread data signals during corresponding disjoint time intervals for users nearer the outside of the cell, and overlapping transmission of spread data signals (i.e., overlapping noise power) for users near the base station of the cell.

For the following exemplary embodiments, networks with data signals are described. However, as would be apparent to one skilled in the art, the exemplary embodiments described herein may be extended to networks having both delay-intolerant signals (e.g., voice and voiceband data users) and delay-tolerant signals (data signals). Each data user may have a minimum data rate requirement that is desirably satisfied. A continuum of data rates may be achieved, although, as would be apparent to those skilled in the art, the present exemplary embodiments may be extended to systems supporting discrete data rates. Data rates may be determined by employing a Gaussian interference model for the signal to interference ratio (S/I), and the desired maximum bit-error rate value for a user is satisfied provided his S/I is greater than a corresponding threshold. Systems operating in accordance with the present invention may employ relatively long term SNR measurements by the base station and/or user transceiver, may be characterized by relatively high data speed, and may integrate both delay tolerant (e.g., data) and delay-intolerant (e.g., voice) transmission when power limits are employed for data users.

Figure 3:
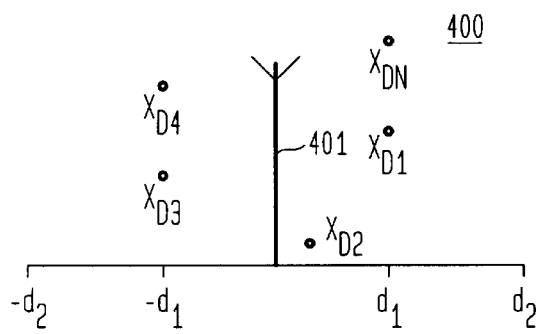
FIG. 3 shows a base station and voice and data users of a CDMA telecommunication system cell employing scheduling in accordance with embodiments of the present invention.

FIG. 3 shows a base station (BS) 401 and data users $x_{D1}$ through $x_{DN}$ of a CDMA telecommunication system cell 400 employing scheduling in accordance with embodiments of the present invention. CDMA telecommunication system cell 400 may be the $k^{th}$ cell, denoted $E_k$, of a network having many cells and where k is an integer greater than 0. In the $k^{th}$ cell $E_k$ are $N^k$ data users, N an integer, and base station 401 is in communication over a down-link channel with $N^k$ data user transceivers $x_{D1}$ through $x_{DN}$. Base station 401 has maximum transmission power $P_{max}$ available, and communicates with data users $x_{D1}$ through $x_{D3}$ during a series of discrete time intervals $\Delta t$.

System Model and Data Rate

The value W is defined as the bandwidth available for transmission of data by the $i^{th}$ data user (i.e., $x_{Di}$) and the value R is the data rate available to the $i^{th}$ data user $x_{Di}$. Defining P as the power received by the transceiver of the $i^{th}$ data user from the BS 401 and defining I as the interference noise power, the energy-per-bit to noise-density ratio ($E_b/N_0$) may be as defined in equation (1):

$$\frac{E_b}{N_o} = \frac{WP}{RI}. \quad (1)$$

The $i^{th}$ data user decodes data of the down-link transmission from the BS 401 with a threshold error probability value $\epsilon$. If the BS 401 decodes (demodulates) with threshold error probability value $\epsilon$, then $E_b/N_0 \geq \gamma$, where $\gamma$ is some threshold determined from $\epsilon$ (i.e., $\gamma = f(\epsilon)$), and is employed below to denote the $E_b/N_0$ value. Although the following uses a $E_b/N_0$ value common to all users, the present invention is not so limited and one skilled in the art may adapt the teachings herein to include varying $E_b/N_0$ values for the different types of user data signals. For a given received power P, the maximum data rate $\overline{R}$ that may be achieved by the $i^{th}$ data user is given in equation (2):

$$\overline{R} = \frac{WP}{\gamma I} \quad (2)$$

The maximum available transmit power for the BS 401 in cell $E_k$ is defined as $P_T^k$. At a given time t, $P^k$ is defined as the power at which BS 401 in cell $E_k$ is transmitting. The value $\phi_i$ is defined as the fraction of power $P^k$ that the BS 401 is transmitting to the $i^{th}$ data user in cell $E_k$, and that the sum of the fractions of power is 1

$$\left( i.e., \sum_{i=1}^{N^k} \phi_i = 1 \right).$$

For cell $E_k$, the set B(k) is defined as the set of cells with corresponding base stations that provide noise interference to the cell $E_k$. Typically, the set B(k) includes those cells that are adjacent to cell $E_k$. Defining $G_i^m$ as the path loss of an interference transmission from the base station in $E_m$ to the $i^{th}$ data user in cell $E_k$, the interference noise provided to the $i^{th}$ data user in cell $E_k$ by the base station transmissions of cell $E_k$ to other users in the cell is defined as $(1-\phi_i)P^k G_i^k f_i$. The value $f_i$ is an orthogonality factor representing a fraction of power transmitted to other users in the cell that appears as interference to the $i^{th}$ data user in cell $E_k$.

If BS 401 employs a set of orthogonal codes during the spreading operation to distinguish signals transmitted to distinct users, then intra-cell interference may be relatively small, such as when the channel is a Gaussian channel (i.e., $f_i=0$). However, when the transmission channel includes effects of multi-path intersymbol interference such that $f_i>0$, The total external interference power $I_i$ experienced by the $i^{th}$ user in cell $E_k$ by transmissions provided by base stations in other cells is given by equation (3):

$$I_i = \sum_{n \in B(k)} G_i^m P^n \quad (3)$$

Using equations (1) through (3), the data rate $\overline{R}$ that the $i^{th}$ user in cell $E_k$ receives at time t is given by equation (4):

$$\overline{R} = \left(\frac{W}{\gamma}\right) \frac{\phi_i P^k G_i^k}{I_i + (1-\phi_i)P^k G_i^k f_i + \eta} \quad (4)$$

where the value $\eta$ is the background noise power.

Scheduling and Power Allocation of Data Transmission

In accordance with the present invention, an intra-cell scheduling method is employed by the BS 401. When BS 401 transmits data in the down-link channel with total available power $P_{max}$ to the $i^{th}$ data user, the base station 401 may only transmit to each user for a time interval equivalent to a fraction of a duty cycle. Consequently, the $i^{th}$ user is allocated a time interval $a_i \Delta t$ in which the base station enables transmission of the corresponding spread data signal to the user during the allocated time interval. The duty cycle $\Delta t$ is the maximum duration of time between successive time intervals of a user for two enabled transmissions of the corresponding spread data signal by the base station.

Figure 1:
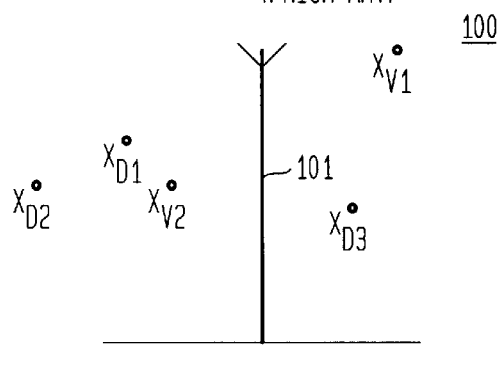
FIG. 1 shows a base station, voice users, and data users of a CDMA telecommunication system cell employing methods of resource management of the prior art.
Figure 2:
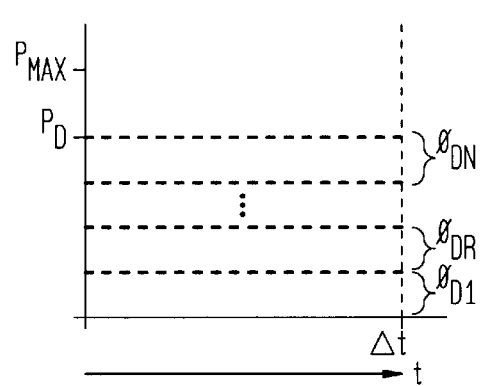
FIG. 2 shows base station transmit power to users versus frequency with a scheduling method of the prior art that uses stacked interference of user power.
Figure 4:
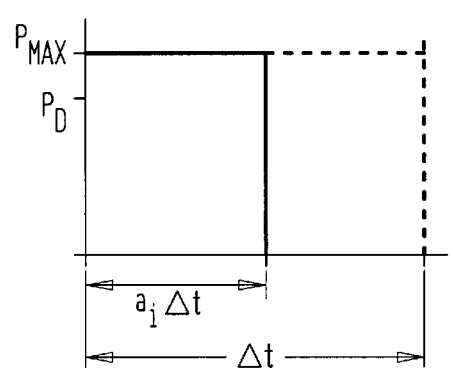
FIG. 4 shows base station transmit power to a user during a time window for the network of FIG. 3 employing an exemplary embodiment of the present invention.
Figure 5:
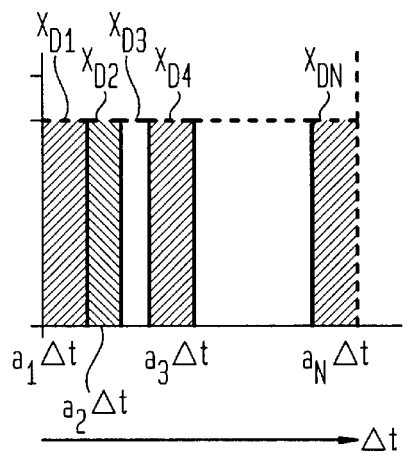
FIG. 5 shows base station transmit power to users versus time with the scheduling method of the present invention of FIG. 4 transmitting signals in the down-link channel one-at-a-time.

As described herein, the fraction $a_i$ may be equivalent to the fraction of total power that the base station would apportion to transmit to a data user under the scheme as shown in FIG. 2. FIG. 4 shows transmit power $P_D$ of a single spread data signal to a user during one duty cycle for the network of FIG. 3 employing an exemplary embodiment of the present invention. FIG. 5 shows base station transmit power to multiple users in scheduled time intervals during the duty cycle with the scheduling method of FIG. 4. The base station 401 selects each user time interval for transmission of the corresponding data signal and transmits signals with power $P_D$ to transceivers of data users $x_{D1}$ through $x_{DN}$. The advantage of intra-cell scheduling in accordance with the present invention may be shown with the ratio of the average throughputs of the intra-cell scheduling and overlapping being greater than 1.

For the CDMA systems of the prior art, such as those conforming to the IS-95 standard, spread data signals that overlap in time may typically be employed for transmission to data users over the down-link channel. For such systems, a fraction $a_i$ of the current total transmit power $P_{max}$ is allocated to the $i^{th}$ data user. Then the maximum data rate for prior art resource allocation of CDMA systems ($\overline{R}_i^{(CDMA)}$) the $i^{th}$ data user may receive is similar to equation (4) with $\phi_i$ replaced by $a_i$ and is given in equation (4')

$$\overline{R}_i^{(CDMA)} = \left(\frac{W}{\gamma}\right) \frac{a_i P^k G_i^k}{I_i + (1-a_i)P^k G_i^k f_i + \eta} \quad (4')$$

Equation (5) gives the maximum data rate, which may also be defined as the throughput per unit time of the $i^{th}$ data user using CDMA systems such as that conforming to the IS-95 standard, since the data rate $\overline{R}_i^{(CDMA)}$ remains relatively constant.

For the exemplary embodiments of the present invention, no signal is transmitted to other data users in the cell during the time interval $a_i \Delta t$ that the BS 401 transmits to the $i^{th}$ data user. Therefore, the $i^{th}$ data user receives no interference noise power from other users in the cell. Since BS 401 still uses the same total power $P_{max}$ for the users at any instant, the users in neighboring cells do not notice any change in their interference power. Given the intra-cell scheduling method, the rate received by the $i^{th}$ data user with intra-cell scheduling is given in equation (5) (derived from equation (4) with $a_i=\phi_i=1$):

$$\overline{R}_i^{(Intra)} = \left(\frac{W}{\gamma}\right) \frac{P^k G_i^k}{I_{ik} + \eta} \quad (5)$$

Hence the total throughput received by the $i^{th}$ data user in unit time is $a_i \overline{R}_i^{(Intra)}$. The ratio $T_{Intra}/T_{CDMA}$ of the average throughputs received by the $i^{th}$ data user in the intra-cell method (equation (5)) to throughput of the CDMA system of the prior art (equation (4')) is given in equation (6):

$$T_{Intra}/T_{CDMA} = 1 + \frac{(1-a_i)P^k G_i^k f_i}{I_{ik} + \eta} \quad (6)$$

Equation (6) shows that for delay-tolerant users and for CDMA telecommunication systems having non-zero orthogonality factors $f_i$, a base station transmitting to one data user at a time yields an improvement in average data rate and throughput over transmitting to users using the method of overlapping spread signals. If $f_i$ is 0, then the average throughput of the CDMA systems may be equivalent to the average throughput of intra-cell scheduling in accordance with the present invention.

As shown in FIG. 4, for the intra-cell scheduling method in accordance with the present invention with systems having receivers that generate relatively minimum self-noise, the BS 401 desirably transmits to the $i^{th}$ data user with relatively maximum available power $P_{max}(=P_T^k)$ By "relatively maximum" available power is meant more than half the total power available for downlink transmission, and preferably more than 90% thereof. This value $P_T^k$ for the level of power of the BS 401 may optimize the data rate and throughput per unit time for users of the cell, and this property is now shown. BS 401 of cell $E_k$ transmits at some intermediate power $P^k$, $0<P^k<P_T^k$ for a period of time and the power transmitted by every BS to each of its users is constant over the time period. Using equation (5), the average data rate over the time period with $a_{ik}=\phi_{ik}=1$ is given in equation (7):

$$\overline{R}_{ik} = \left(\frac{W}{\gamma}\right)\frac{P^k G_{ik}^k}{I_{ik}+\eta}, \text{ and } I_{ik} = \sum_{m \in B(k)} P^m G_{ik}^m \qquad (7)$$

where $I_{ik}$ is the external interference noise power of other cells provided to cell $E_k$.

If the intra-cell scheduling method is employed, full power $P_T^k$ is allocated to a user i (the $i^{th}$ data user) instead of using transmit power $P^k$. BS 401 of cell $E_k$ transmits to one user $i_k$ for a proportion $(P^k/P_T^k)$ of the time and at minimal power otherwise. Consequently, the average power for a cell remains constant. Then user $i_k$ maintains the same average rate over that period because the average power and interference power received does not change, whereas all other users receive the same interference power and may now increase their average rates to $R_{ik}$. The average rates $R_{ik}$ increase to a value greater than the rate $\overline{R}_{ik}$ of equation (7) because of the convexity of the interference of equation (7) for each $P^m$, $m \in B(k)$.

Scheduling, Power, and Rate Allocation of a Data Network

Given the exemplary intra-cell scheduling method described with respect to FIGS. 4 and 5, scheduling in accordance with the present invention for multiple cells (inter-cell scheduling) is now described. For exemplary implementations and networks in accordance with the present invention, a base station schedules data transmission to data users of a data network with multiple cells. Base stations that schedule transmission are preferably synchronized with each other or with a centralized time base. Scheduling may be related to two parameters for given user data requirements (e.g., BER) and time period. The first parameter is the rate. The rate is the instant number of bits or symbols per unit time transmitted through the channel for a user; and this value of rate may change based on power and location, where the latter determines the signal to noise ratio. The "noise" in the signal to noise ratio is typically the sum of external noise and base-station interference. The second parameter is the throughput. The throughput is the average rate times the duty cycle. The duty cycle is the duty cycle of each cell, assuming intra-cell scheduling in accordance with the present invention is used (i.e., the signal "on" and "off" time intervals of a duty cycle are set, such as shown in FIGS. 4 and 5).

An exemplary implementation of a data network includes a linear array of cells with an arbitrary distribution of users in each cell. Such a data network is shown in FIGS. 6A through 6D. Each base station $E_k$ interferes with user signals of its two neighboring cells $E_{k-1}$ and $E_{k+1}$. Using inter-cell scheduling in accordance with the present invention, each base station has on and off periods during which the total transmit power is $P_T^k$ and 0, respectively. When the base station of cell $E_k$ is transmitting to the $i^{th}$ data user, the average rate received by the $i^{th}$ data user is given in equation (8):

$$\overline{R}_{ik} = \left(\frac{W}{\gamma}\right)\frac{P_T^k G_i^k}{\delta_{k-1} P_T^{k-1} G_i^{k-1} + \delta_{k+1} P_T^{k+1} G_i^{k+1} + \eta} \qquad (8)$$

where $\delta_j(j=k, k-1, k+1)$ is 1 if the base station of cell $E_j$ is on (transmitting) and 0 otherwise. The scheduling time interval may be common to all base stations and may be of unit length. The fraction that the base station of cell $E_k$ is on (transmitting) in the scheduling time interval may be referred to as the duty cycle of the cell.

Figure 6A:
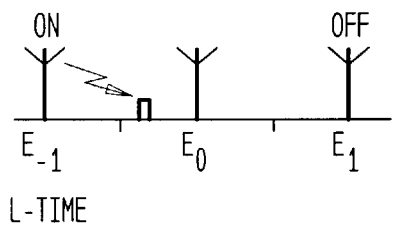
FIG. 6A shows a linear network of adjacent base stations operating in L-time.
Figure 6B:
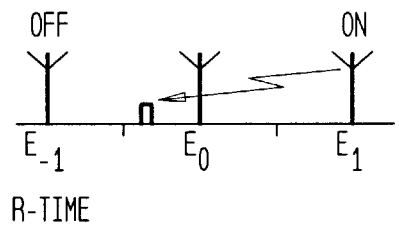
FIG. 6B shows a linear network of adjacent base stations operating in R-time.
Figure 6C:
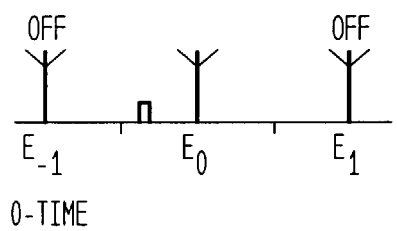
FIG. 6C shows a linear network of adjacent base stations operating in 0-time.
Figure 6D:
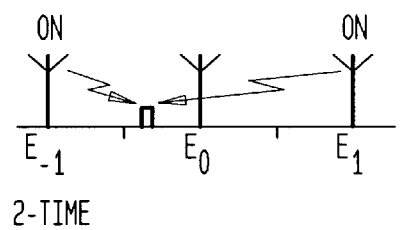
FIG. 6D shows a linear network of adjacent base stations operating in 2-time.

FIG. 6A shows a linear network of adjacent base stations operating in L-time. The L-time of a cell is defined as the time during which only its left neighboring base station is on. FIG. 6B shows a linear network of adjacent base stations operating in R-time in which only the right neighboring base station transmits over the down-link to a user. Similarly defined are the cell $E_k$'s 0-time and 2-time (i.e, the periods in which the neighboring base stations either don't transmit at all or both neighboring base stations are transmitting to their corresponding users, respectively) as illustrated in FIGS. 6C and 6D.

If the BS in $E_0$ transmits to the ith data user, the power received by that user from its own BS is $P_i$, is $P_T^0 G_i^0$. In addition, the left interference power $(P_{li})$ received by the $i^{th}$ data user in cell $E_0$ from the base station of $E_{-1}$ whenever the BS of $E_{-1}$ is transmitting is $P_T^{(-1)} G_i^{(-1)}$. In a similar manner the right interference power $(P_{ri})$ whenever the BS of $E_1$ is transmitting is $P_T^1 G_i^1$. The fractions of the total time that the $i^{th}$ data user in cell $E_0$ receives transmission from its own BS in L-time and R-time are defined as $\tau_{li}$ and $\tau_{ri}$, respectively. Similarly, the fraction of the total time that the $i^{th}$ data user in cell $E_0$ receives transmission from its own BS as well as transmissions from both the BSs of $E_{-1}$ and $E_1$ is defined as $\tau_{2i}$. The fraction of the total time that the $i^{th}$ data user in cell $E_0$ receives transmission from its own BS and neither of the BSs of $E_{-1}$ and $E_1$ is defined as $\tau_{0i}$. The value $\tau_l^k$ is the total of all fractions in L-time of the cell $E_k$ and is defined as $$\sum_{i \in E_k} \tau_{li}.$$

The values $\tau_r^k$, $\tau_0^k$ and $\tau_2^k$ for the total of all fractions in R-time, 0-time, and 2-time may be similarly defined.

During 2-time, the power of signals transmitted from BSs in both cells $E_{-1}$ and $E_1$ interfere with the signal transmitted to the $i^{th}$ data user in cell $E_0$. Given the previous definitions and equation (7), the normalized rate $R_{2i}$ the $i^{th}$ data user in cell $E_0$ receives during 2-time may be as given by equation (9):

$$R_{2i} = \frac{\gamma \overline{R}_{2i}}{W} = \frac{P_i}{P_{li}+P_{ri}+\eta} = \frac{P_i}{\eta(1+\beta_{li}+\beta_{ri})}, \qquad (9)$$

with the normalization $\beta_{li}=P_{li}/\eta$, $\beta_{ri}=P_{ri}/\eta$.

Similar equations may be derived for normalized rates that may be available to the $i^{th}$ data user in cell $E_0$ during R-time, L-time, and 0-time. The normalized throughput $T_i$ per unit time obtained by the $i^{th}$ data user in cell $E_0$ may be as given in equation (10):

$$T_i = \frac{\tau_{oi} P_i}{\eta} + \frac{\tau_{li} P_i}{\eta(1+\beta_{li})} + \frac{\tau_{ri} P_i}{\eta(1+\beta_{ri})} + \frac{\tau_{2i} P_i}{\eta(1+\beta_{li}+\beta_{ri})} \quad (10)$$

As shown in equation (10), the schedule of transmissions for each user in the network may be expressed using values for portions ($\tau_{li}, \tau_{ri}, \tau_{oi}, \tau_{2i}$) of the total time period allocation $\tau$, where $\tau = \{(\tau_{li}, \tau_{ri}, \tau_{oi}, \tau_{2i}), i \in E_k, k \in Z\}$, where Z is the set of cells in the network. Solutions for the schedule may be found by forming a linear programming problem for the network, and then solving the linear programming problem.

For example, a linear cluster of cells is defined as the set S and is formed from the set Z of all cells in the linear network (i.e., $S \subset Z$). The space $F_S$ is defined as the feasible space of time allocations for users in the subset S, and the value $A_i$ is defined as the minimum throughput value for the $i^{th}$ data user. The following values are defined: The total transmit time period allocation $\tau_l^{k,on}$ is defined as the time period that the base station $E_k$ is on (transmitting to the users) in L-time, and $\tau_r^{k,on}, \tau_0^{k,on}$, and $\tau_2^{k,on}$ are similarly defined for R-time, 0-time, and 2-time, respectively. The total transmit time period allocation $\tau_l^{k,off}$ is defined as the time period that the base station $E_k$ is off (not transmitting) in L-time, and $\tau_r^{k,off}, \tau_0^{k,off}$, and $\tau_2^{k,off}$ are similarly defined for R-time, 0-time, and 2-time, respectively.

Given these defined values, the time period allocations may satisfy the constraints given in equations (11a) through (11f). First, a total time allocation $$\tau_l^{k,on} = \sum_{i=1}^{N_k} \tau_{li}^{k,on} \quad (11a)$$

where $N_k$ is the number of user in cell $E_k$. Similar identity relations hold for $\tau_r^{k,on}, \tau_0^{k,on}$, and $\tau_2^{k,on}$. Equation (11b) yields the identity for the conservation of time for the duty cycle:

$$\tau_l^{k,on} + \tau_r^{k,on} + \tau_0^{k,on} + \tau_2^{k,on} + \tau_l^{k,off} + \tau_r^{k,off} + \tau_0^{k,off} + \tau_2^{k,off} = 1, \quad (11b)$$

given that the total normalized time period for a duty cycle is 1.

The base station of cell $E_k$ is off with 0- or L-time, and the base station of cell $E_{k+1}$ is off with 0- or R-time, when the base stations of both cells $E_k$ and $E_{k+1}$ are off, which yields the identity given in equation (11c):

$$\tau_0^{k,off} + \tau_l^{k,off} = \tau_0^{k+1,off} + \tau_r^{k+1,off} \quad (11c)$$

The base station of cell $E_k$ is off with R- or 2-time, and the base station of cell $E_{k+1}$ is on with 0- or R-time, when the base station of cell $E_k$ is off and the base station of cell $E_{k+1}$ is on, yielding the identity of equation (11d):

$$\tau_r^{k,off} + \tau_0^{k,off} = \tau_0^{k+1,on} + \tau_r^{k+1,on} \quad (11d)$$

The base station of cell $E_k$ is on with 0- or L-time, and the base station of cell $E_{k+1}$ is off with L- or 2-time, when the base station of cell $E_k$ is on and the base station of cell $E_{k+1}$ is off, yielding the identity given in equation (11e):

$$\tau_0^{k,on} + \tau_l^{k,on} = \tau_l^{k+1,off} + \tau_2^{k+1,off} \quad (11e)$$

The base station of cell $E_k$ is on with R- or 2-time, and the base station of cell $E_{k+1}$ is on with L- or 2-time, when both the base stations of cells $E_k$ and $E_{k+1}$ are on, yielding the identity given in equation (11f):

$$\tau_r^{k,on} + \tau_2^{k,on} = \tau_l^{k+1,on} + \tau_2^{k+1,on} \quad (11f)$$

Satisfying time period allocations for the duty cycle as given by equations (11a) through (11f) provides for feasible time period allocations for transmitting signals to the data users of cell $E_k$ in a linear network.

Given these definitions, the scheduling of user transmissions may have objective functions such as a maximizeable total throughput, thus leading to a feasible time period allocation. Consequently, an exemplary linear programming problem may be formed from equation (10), with appropriate constraints and objective functions optimizeable for a relative maximum total of equation (12). Equations (11a) through (11f) define a set of constraints appropriate when the network is a linear network. Thus, an illustrative linear programming problem is expressed by:

$$\max \sum_{j \in S} \sum_{i \in E_j} T_i, \text{ with } T_i \geq A_i, i \in \bigcup_{j \in S} E_j \quad (12)$$

where the term "max" indicates the mathematical maximum. As would be apparent to one skilled in the art, forms of optimization criteria other than that shown in equation (12) may be employed.

For an exemplary symmetric network, the time period allocations for all users may be equivalent within each cell. Consequently, the time period allocation values may be simplified to $\tau_{li}^k = \tau_{li}; \tau_{ri}^k = \tau_{ri}; \tau_{2i}^k = \tau_{2i};$ and $\tau_{0i}^k = \tau_0$ for all k. In addition, the "on" and "off" periods may be simplified to $\tau_l^{k,on} = \tau_l^{on}; \tau_r^{k,on} = \tau_r^{on}; \tau_2^{k,on} = \tau_2^{on};$ and $\tau_0^{k,on} = \tau_0^{on}$. In such symmetric network and given simplifications to the time period allocation values, the constraints of equations (11a) through (11f) may be reduced to the constraints given in equations (13) and (14) (where the superscript "on" dropped for clarity):

$$\tau_0 = \sum_{i=1}^{N_k} \tau_{0i}; \quad \tau_l = \sum_{i=1}^{N_k} \tau_{li}; \quad \tau_r = \sum_{i=1}^{N_k} \tau_{ri}; \quad \tau_2 = \sum_{i=1}^{N_k} \tau_{2i} \quad (13)$$

$$2\tau_0 + 3\tau_1 + \tau_2 = 1 \quad (14)$$

from which the optimality constraint of equation (15) may be derived:

If $\beta_{li} + \beta_{ri} < 1$, then $\tau_{0i} = 0$; and $\beta_{li} + \beta_{ri} > 1$, then $\tau_{2i} = 0$ (15)

Figure 7:
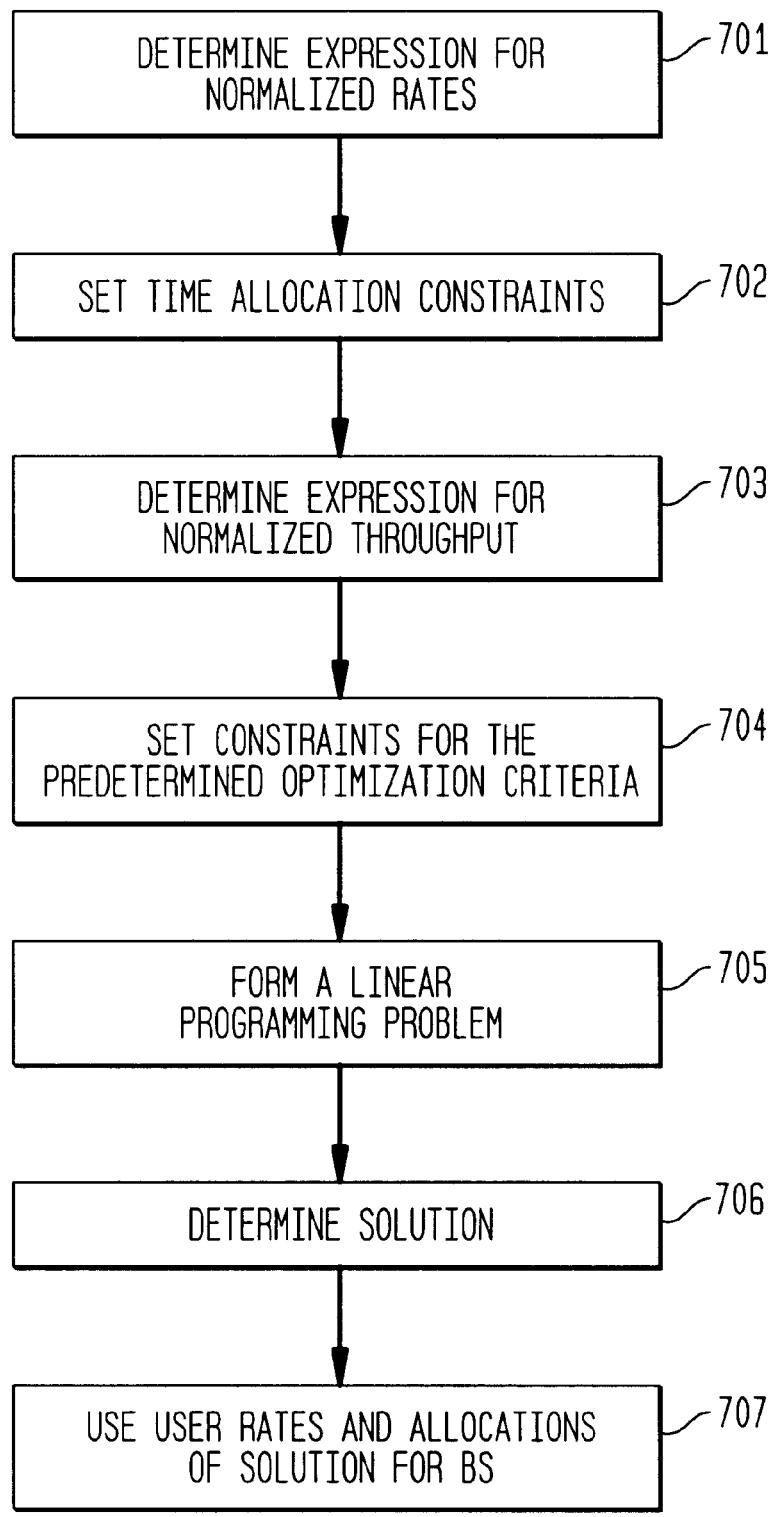
FIG. 7 is a flow chart of the method of determining scheduling using a linear programming model.

FIG. 7 is a flow chart of the method of determining scheduling of signals to users in a cell $E_0$ using a linear programming problem. First, at step 701 the expressions for normalized rates are determined for each of the combinations of cell interference of the network. For example, expressions for normalized rates such as given in equation (9) may be determined in the linear network of FIGS. 6A–6D for 0-, 2-, L-, and R-time.

At step 702, the constraints are set for time allocation, such as the constraints given for the linear network of equation (11). At step 703, the normalized rates are employed to determine the expression for normalized throughput of a cell, such as the expression given in equation (10). At step 704 the constraints are set so as to ensure feasibility of the time allocations, and an optimization criterion, such as the maximized throughput is selected (such as given in equation (12)).

At step 705, a linear programming problem is formed using the expressions determined in steps 701 and 702, and the constraints as set in steps 703 and 704. At step 706 the solution to the linear programming problem of step 705 is generated. As would be apparent to one skilled in the art, network configuration, additional constraints, or other factors maybe added in steps 705 and 706 to convert the linear programming problem into an integer programming problem. For either linear or integer programming problems, techniques for solving such problems are well known in the art. The solution generated in step 706 is applied to step 707. The solution, i.e., the output of the linear program, includes the fraction of time to be allocated to each user within the cell, and it also includes the rate at which the base station is to transmit to each user. It should be noted that this transmission rate may vary between duty cycles. It should further be noted that the particular order in which users receive downlink transmissions from the base station is typically immaterial.

As an example of a particular implementation, the general, exemplary linear programming problem defined in equation (10) through equation (12) may, for example, simply include a particular cell $E_0$ in the network and cell $E_0$'s two neighboring cells $E_{-1}$ and $E_1$ such as shown in FIGS. 6A–6D. For this case, the network is assumed to be a symmetric network. The users in cell $E_0$ may be indexed as data users 1 through M (user 1 through user M), starting with the left most user and proceeding towards the right. The normalized values for $\beta_{li}$ and $\beta_{ri}$ satisfy the monotonicity properties: a) if i>j then $\beta_{ri}>\beta_{rj}$ and $\beta_{li}>\beta_{lj}$; and b) if the $i^{th}$ data user is closer to the base station of cell $E_0$ than user j, then $\beta_{li}+\beta_{ri}<\beta_{lj}+\beta_{rj}$.

The quantity r* is defined as the network-wide allocation of transmission intervals to the data users 1 through M, and the transmission times allocated to the $i^{th}$ data user (i.e., user i) in cell $E_0$ during an interval are $\tau^*_{li}, \tau^*_{ri}, \tau^*_{0i}, \tau^*_{2i}$. The exemplary solution for the linear programming problem may satisfy the following conditions: i) if i>j, then $\tau^*_{ri}>0$ implies $\tau^*_{lj}=\tau^*_{0j}=\tau^*_{2j}=0$, and $\tau^*_{lj}>0$ implies $\tau^*_{ri}=\tau^*_{0i}=\tau^*_{2i}=0$; and ii) if user j is closer to the base station of cell $E_0$ than user i, then $\tau^*_{2i}>0$ implies $\tau^*_{0j}=0$, and $\tau^*_{0j}>0$ implies $\tau^*_{2i}=0$.

Condition (i) relates to the outer set of users in the left part of cell $E_0$ receiving data only when the right interferer $E_1$ is on, and a similar outer set of users in the right part of cell $E_0$ receiving data only when the left interferer $E_{-1}$ is on. Condition (ii) implies that if cell $E_0$ needs to transmit when both interferers are on, then it would prefer to do so to users which are closer to the base station. The optimal solution may be characterized by specifying the leftmost user that has non-zero R-time, the rightmost user that has non-zero L-time, and the innermost users (possibly one or either side of the base station) that have non-zero 0-time.

The above conditions may hold in other exemplary implementations even when the duty cycles and relative shifts between the transmission intervals of cells E–1, $E_0$, and $E_1$ are fixed and only the allocations of transmission intervals to the data users 1 through M within each cell may be adjusted.

Hybrid CDMA/Time-Sharing Scheme

In a case where the user's signals are at maximum rate (minimum spreading) and do not require full transmit power for reception by a user with minimum required SNR, the power of the signal may then be set to a level consistent with reception at or near the minimum required SNR at the user's transceiver. For the set of spreading constraints defining this case, users may be partitioned into two groups. For example, users in the group that are physically closer to a transmitting antenna of a base station (i.e., at the center of the cell) may generally receive a signal in the down-link that has a much higher signal-to-noise ratio than that of the signal received in the down-link by a user at the edge of the cell. In accordance with the present invention, a combination of both prior art CDMA transmission for one group (i.e., "CDMA mode" such as overlapping in frequency of the users' spread signal power such as shown in FIG. 2) and scheduling (time-sharing) of user transmissions in accordance with the present invention for the second group may be employed for reducing overall transmitted power by a base station.

For example, a simulation may be generated of symmetrical networks having different corresponding values of the orthogonality factor f. Results of simulations may be compared with the results computed for intra-cell scheduling only as the solution for the optimized linear programming problem of equations (10) through (12) (with the time period, or duty cycle, of all base stations set to 1).

For the network employed for the simulation of hybrid CDMA/Time-sharing, each base station transmits to an inner set of users with overlapping for part of the time, and transmits to the outer set of the users with scheduling in accordance with an implementation of the present invention for the remaining time. Referring to FIG. 3, the inner set of users may be located in the cell between $-d_1$ and $d_1$, while the outer set of users may be located in the cell between $-d_2$ and $-d_1$ and between $d_1$ and $d_2$. As defined herein, a user's "location" may not necessarily be a physical location, but may rather be a position within a range of signal-to-noise ratios or family of gains. If the inner set of users is large, for example, the spreading rate constraint $R_{max}=0.1W$ may be met; consequently, the portion of the time allocated to the inner set of users then depends on their minimum rate requirement. The orthogonality factor determines the interference between users in CDMA mode, and the minimum size of the inner set of users in CDMA mode is related to this orthogonality factor.

For the simulation, 32 users are uniformly spaced throughout the cell, and all users have a common minimum throughput requirement. The inner set comprises the N innermost users, and the variable $\rho$ is defined as the fraction N/32. When $\rho$ is "1", all down-link signals to users in the cell are sent during CDMA mode, and when $\rho$ is 0 all down-link signals to users in the cell are sent during intra-cell scheduling.

Figure 8:
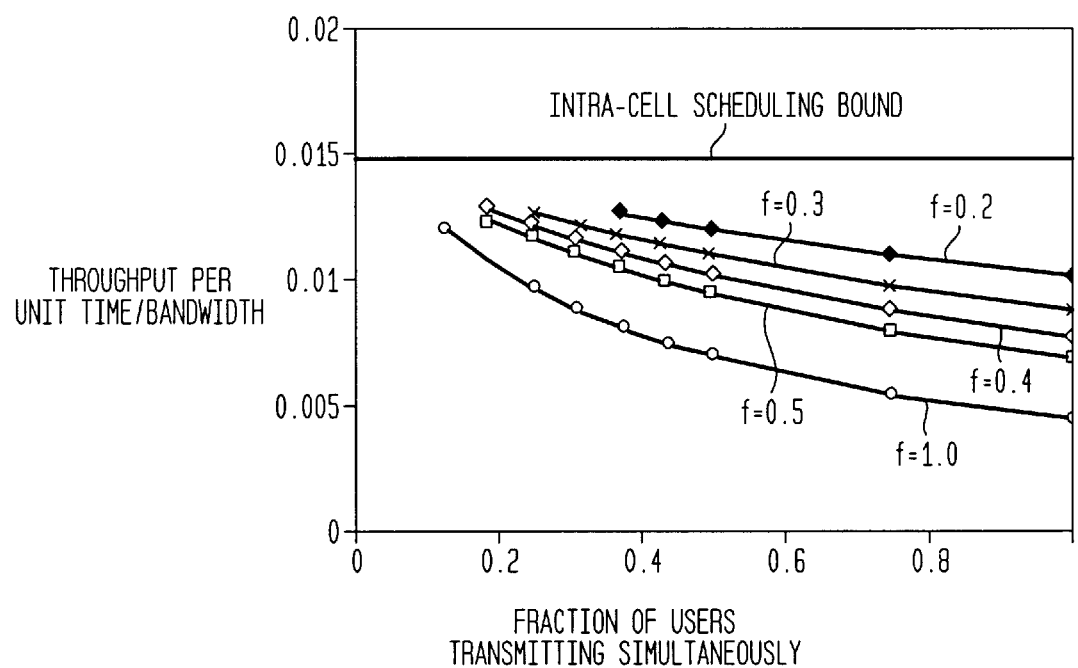
FIG. 8 is a graph of throughput versus fraction of users transmitting of simulations for a telecommunication system employing a hybrid CDMA/time-sharing method of scheduling.

FIG. 8 is a theoretical graph of throughput versus fraction of users transmitting for a telecommunication system employing a hybrid CDMA/time-sharing method of scheduling. As shown in FIG. 8, the simulation of maximum common minimum throughput is plotted against the fraction $\rho$ of the inner set of users in the CDMA set. The left-most point of each plotted curve corresponds to the minimum size of the inner set for the corresponding value of orthogonality factor to meet the $R_{max}$ constraint. When the inner set is selected for the minimum size, the hybrid CDMA/Time-sharing method of scheduling approaches within 15% of the calculated bound of the intra-cell scheduling method. Since at least a fraction of the users within a cell may receive signal in the down-link with lower transmit power of the base station, base station power, and hence interference power to other cells, may be reduced.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of intra-cell scheduling of transmission by a base station of one or more spread data signals to corresponding users in a cell comprising the steps of:
    (a) allocating to each user of a first set of users one of a set of disjoint time intervals, and to each user of a second set of users a common time interval;
    (b) defining a duty cycle as the relative maximum duration of time between successive time intervals of a user for two enabled transmissions of the corresponding spread data signal by the base station; and
    (c) transmitting, by the base station, each spread data signal to the corresponding user during the allocated time interval, wherein each time interval of the duty cycle is non-overlapping and the base station transmits a spread data signal to one user at a time during the duty cycle.

2. The invention as recited in claim 1, wherein for step (c) the corresponding spread user signals for the second set of users are transmitted concurrently during the common time interval.

3. The invention as recited in claim 1, wherein each user is assigned to either the first or second set of users based on a set of spreading constraints.

4. The invention as recited in claim 1, wherein step (c) further includes the step of 1) transmitting at a transmit power level to each corresponding spread data signal of the first set of users, wherein the transmit power level is near a relative maximum transmit power of the base station.

5. A method of intra-cell scheduling of transmission by a base station of one or more spread data signals to one or more corresponding users in a cell, the method comprising:
    (a) allocating to each of the one or more users a recurrent time interval during which transmission of each spread data signal from the base station to the corresponding user is enabled;
    (b) before the allocating step, solving a linear problem that characterizes the cell, the linear problem having a set of constraints for optimization of throughput, to determine the recurrent time interval for each of said users; and
    (c) after the allocating step, transmitting each of said one or more spread data signals from the base station to the corresponding user during an allocated time interval that does not overlap the time interval allocated to any other of said one or more users, such that a transmission is made to one user at a time, wherein a transmit power of each of said one or more spread data signals is near a relative maximum transmit power of the base station.

6. The invention as recited in claim 5, wherein the time intervals and transmit powers of the one or more spread data signals are allocated based on predetermined minimum average rates for corresponding users in the cell.

7. The invention as recited in claim 5, wherein the time intervals and transmit powers of the one or more spread data signals are determined for corresponding users in the cell in accordance with an optimization criterion based on relative throughput.

8. The invention as recited in claim 5, wherein the time intervals and transmit powers of the one or more spread data signals are determined using received signal-to-interference noise values measured by corresponding users in the cell.

9. The invention as recited in claim 5, wherein, for step (a), each user of a first set of users is allocated one of a set of disjoint time intervals, and each user of a second set of users is allocated a common time interval.

10. The invention as recited in claim 9, wherein for step (c) the corresponding spread user signals for the second set of users are transmitted concurrently during the common time interval.

11. The invention as recited in claim 9, wherein each user is assigned to either the first or second set of users based on a set of spreading constraints.

12. The invention as recited in claim 9, wherein:
    step (c) comprises transmitting each corresponding spread data signal of the first set of users at a transmit power level; and
    said transmit power level is near the relative maximum transmit power of the base station.

13. A method of intra-cell scheduling of transmission by a base station of one or more spread data signals to one or more corresponding users in a cell, the method comprising:
    (a) allocating to each of the one or more users a recurrent time interval during which transmission of each spread data signal from the base station to the corresponding user is enabled;
    (b) before the allocating step, solving a linear programming problem that characterizes the cell, thereby to determine the recurrent time interval for each of said users;
    (c) after the allocating step, transmitting each of said one or more spread data signals from the base station to the corresponding user during an allocated time interval that does not overlap the time interval allocated to any other of said one or more users, such that a transmission is made to one user at a time; and
    (d) transmitting, by the base station, one or more spread signals to one or more corresponding delay-intolerant users in the cell, wherein the base station transmits each spread signal to the corresponding delay-intolerant user during a corresponding time period that overlaps one or more time intervals and step (d) comprises the steps of:
        d1) allocating a transmit power to each spread data signal, the transmit power defined as the difference between a relative maximum transmit power of the base station and a total transmit power allocated to the one or more spread signals of the delay-intolerant users, and
        d2) transmitting each spread data signal with the corresponding transmit power during the time interval.

14. The invention as recited in claim 13, wherein, for step (d), each spread signal of a delay-intolerant user is either a voice or a voiceband data spread signal.

15. A method of intra-cell scheduling of transmission by a base station of one or more spread data signals to one or more corresponding users in a cell, the method comprising:

(a) allocating to each of the one or more users a recurrent time interval during which transmission of each spread data signal from the base station to the corresponding user is enabled, wherein step (a) comprises the steps of:
  a1) allocating to each user of a first set of users one of a set of disjoint time intervals, and
  a2) allocating to each user of a second set of users a common time interval;
(b) before the allocating step, solving a linear programming problem that characterizes the cell, thereby to determine the recurrent time interval for each of said users; and
(c) after the allocating step, transmitting each of said one or more spread data signals from the base station to the corresponding user during an allocated time interval that does not overlap the time interval allocated to any other of said one or more users, such that a transmission is made to one user at a time, wherein step (c) comprises the steps of:
  c1) allocating a transmit power to each spread data signal, and
  c2) transmitting each spread data signal with the corresponding transmit power during the time interval, wherein the transmit power level of the first set of users is near a relative maximum transmit power of the base station.

16. Apparatus for intra-cell scheduling of transmission by a base station of one or more spread data signals to corresponding users in a cell comprising:
  a control module for:
    (1) allocating to each of the one or more users a recurrent time interval during which transmission of each spread data signal from the base station to the corresponding user is enabled, and
    (2) before the allocating step, solving a linear problem that characterizes the cell, the linear problem having a set of constraints for optimization of throughput, to determine the recurrent time interval for each of said users; and
  a transmit module for transmitting each of said one or more spread data signals from the base station to the corresponding user during an allocated time interval that does not overlap the time interval allocated to any other of said one or more users, such that a transmission is made to one user at a time,
  wherein a transmit power of each of said one or more spread data signals is near a relative maximum transmit power of the base station.

17. The invention as recited in claim 16, wherein the time intervals and transmit powers of the one or more spread data signals are allocated based on predetermined minimum average rates for corresponding users in the cell.

18. The invention as recited in claim 16, wherein the time intervals and transmit powers of the one or more spread data signals are determined for corresponding users in the cell in accordance with an optimization criteria based on relative throughput.

19. The invention as recited in claim 16, wherein the time intervals and transmit powers of the one or more spread data signals are determined using received signal-to-interference noise values measured by corresponding users in the cell.

20. The invention as recited in claim 16, wherein each user of a first set of users is allocated one of a set of disjoint time intervals, and each user of a second set of users is allocated a common time interval.

21. The invention as recited in claim 20, wherein the corresponding spread user signals for the second set of users are transmitted concurrently during the common time interval.

22. The invention as recited in claim 20, wherein each user is assigned to either the first or second set of users based on a set of spreading constraints.

23. The invention as recited in claim 20, wherein the transmit module transmits at a transmit power level to each corresponding spread data signal of the first set of users, wherein the transmit power level is near the relative maximum transmit power of the base station.

24. Apparatus for intra-cell scheduling of transmission by a base station of one or more spread data signals to corresponding users in a cell comprising:
  a control module for:
    (1) allocating to each of the one or more users a recurrent time interval during which transmission of each spread data signal from the base station to the corresponding user is enabled, and
    (2) before the allocating step, solving a linear programming problem that characterizes the cell, thereby to determine the recurrent time interval for each of said users; and
  a transmit module for transmitting each of said one or more spread data signals from the base station to the corresponding user during an allocated time interval that does not overlap the time interval allocated to any other of said one or more users, such that a transmission is made to one user at a time,
  wherein the transmit module further transmits one or more spread signals to one or more corresponding delay-intolerant users in the cell during a duty cycle such that each corresponding spread signal is transmitted during a corresponding time period that overlaps one or more time intervals, and
  wherein the control module allocates a transmit power to each spread data signal, the transmit power defined as the difference between a relative maximum transmit power of the base station and a total transmit power allocated to the one or more spread signals of delay-intolerant users; and the transmit module transmits each spread data signal with the corresponding transmit power during the time interval.

25. The invention as recited in claim 24, wherein each spread signal of a delay-intolerant user is either a voice or a voiceband data spread signal.

26. Apparatus for intra-cell scheduling of transmission by a base station of one or more spread data signals to corresponding users in a cell comprising:
  a control module for:
    (1) allocating to each of the one or more users a recurrent time interval during which transmission of each spread data signal from the base station to the corresponding user is enabled, wherein each user of a first set of users is allocated one of a set of disjoint time intervals, and each user of a second set of users is allocated a common time interval, and
    (2) before the allocating step, solving a linear programming problem that characterizes the cell, thereby to determine the recurrent time interval for each of said users,
    wherein the control module allocates a transmit power to each spread data signal, and the transmit module transmits each spread data signal with the corresponding transmit power during the time interval; and
  a transmit module for transmitting each of said one or more spread data signals from the base station to the corresponding user during an allocated time interval that does not overlap the time interval allocated to any other of said one or more users, such that a transmission is made to one user at a time, wherein the transmit module transmits each corresponding spread data signal to the first set of users at a transmit power level, wherein the transmit power level is near a relative maximum transmit power of the base station.

27. A computer-readable medium having stored thereon a plurality of instructions, the plurality of instructions including instructions which, when executed by a processor, cause the processor to implement a method for of intra-cell scheduling of transmission by a base station of one or more spread data signals to corresponding users in a cell, the method comprising the steps of:

(a) allocating to each of the one or more users a recurrent time interval during which transmission of each spread data signal from the base station to the corresponding user is enabled;

(b) before the allocating step, solving a linear problem that characterizes the cell, the linear problem having a set of constraints for optimization of throughput, to determine the recurrent time interval for each of said users; and (c) after the allocating step, transmitting each of said one or more spread data signals from the base station to the corresponding user during an allocated time interval that does not overlap the time interval allocated to any other of said one or more users, such that a transmission is made to one user at a time, wherein a transmit power of each of said one or more spread data signals is near a relative maximum transmit power of the base station.

* * * * *